(12) United States Patent
Kobayashi et al.

(10) Patent No.: US 10,929,446 B2
(45) Date of Patent: Feb. 23, 2021

(54) DOCUMENT SEARCH APPARATUS AND METHOD

(71) Applicant: KABUSHIKI KAISHA TOSHIBA, Tokyo (JP)

(72) Inventors: Yuka Kobayashi, Seto Aichi (JP); Tomomi Tsubota, Tachikawa Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 999 days.

(21) Appl. No.: 15/421,404

(22) Filed: Jan. 31, 2017

(65) Prior Publication Data

US 2017/0140037 A1 May 18, 2017

Related U.S. Application Data

(63) Continuation of application No. PCT/JP2015/058541, filed on Mar. 20, 2015.

(51) Int. Cl.
*G06F 7/00* (2006.01)
*G06F 16/33* (2019.01)
(Continued)

(52) U.S. Cl.
CPC ........ *G06F 16/3344* (2019.01); *G06F 16/332* (2019.01); *G06F 16/3349* (2019.01); *G06F 16/93* (2019.01)

(58) Field of Classification Search
CPC .... G06F 16/3344; G06F 16/93; G06F 16/332; G06F 16/3349; G06F 16/313;
(Continued)

(56) References Cited

U.S. PATENT DOCUMENTS

| | | | |
|---|---|---|---|
| 2006/0080361 A1 | 4/2006 | Suzuki et al. | |
| 2007/0022099 A1* | 1/2007 | Yoshimura | G06F 16/3329 |

(Continued)

FOREIGN PATENT DOCUMENTS

| | | | |
|---|---|---|---|
| JP | 2002183195 A | 6/2002 | |
| JP | 2002342361 A | 11/2002 | |

(Continued)

OTHER PUBLICATIONS

International Search Report (ISR) and Written Opinion dated Jun. 23, 2015 issued in International Application No. PCT/JP2015/058541.

*Primary Examiner* — Azam M Cheema

(74) *Attorney, Agent, or Firm* — Holtz, Holtz & Volek PC

(57) ABSTRACT

According to one embodiment, a document search apparatus includes the following elements. The query word extraction unit extracts, from an input sentence, a word for use in a search as a query word. The intention estimation unit estimates a search intention based on the input sentence. The query generator acquires, from a search expression list, a search expression corresponding to the estimated search intention, acquires, from an additional query word list, an additional query word corresponding to a set of the acquired search expression and the extracted query word, and generates a query based on the extracted query word, the acquired additional query word, and the acquired search expression. The search unit searches for a document that matches the query.

15 Claims, 10 Drawing Sheets

(51) Int. Cl.
*G06F 16/93* (2019.01)
*G06F 16/332* (2019.01)

(58) Field of Classification Search
CPC .... G06F 16/3334; G06F 40/268; G06F 40/40; G06F 40/242; G06F 40/247; G06F 40/30
See application file for complete search history.

(56) References Cited

U.S. PATENT DOCUMENTS

| | | | |
|---|---|---|---|
| 2010/0057725 A1* | 3/2010 | Matsumura | G06F 16/00 707/E17.017 |
| 2012/0173562 A1 | 7/2012 | Zhu et al. | |
| 2014/0156277 A1 | 6/2014 | Fujii et al. | |
| 2014/0196092 A1 | 7/2014 | Chung et al. | |

FOREIGN PATENT DOCUMENTS

| | | | |
|---|---|---|---|
| JP | 2003108584 A | 4/2003 | |
| JP | 2003132060 A | 5/2003 | |
| JP | 2004234288 A | 8/2004 | |
| JP | 2005196804 A | 7/2005 | |
| JP | 2006091994 A | 4/2006 | |
| JP | 2007299159 A | 11/2007 | |
| JP | 2012008610 A | 1/2012 | |
| JP | 2014501422 A | 1/2014 | |
| JP | 2014109897 A | 6/2014 | |
| JP | 2014132464 A | 7/2014 | |

* cited by examiner

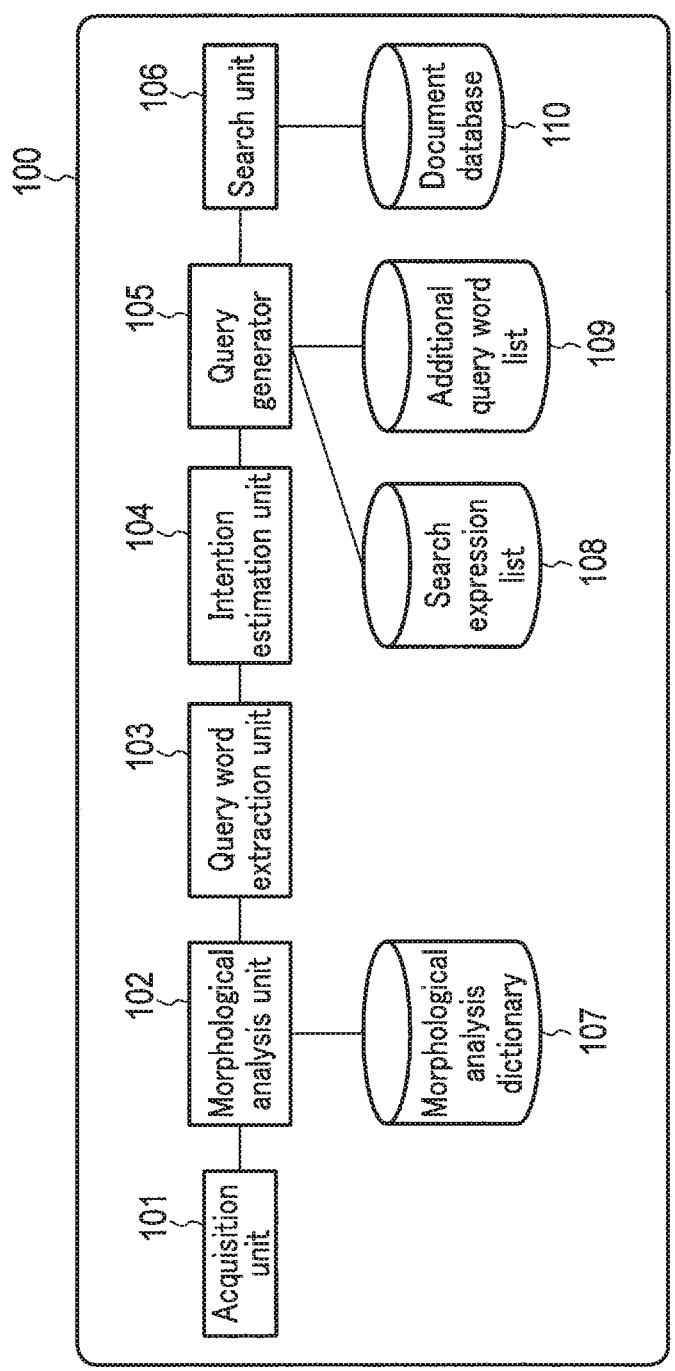
F I G. 1

| Input example | Keyword | Key phrase | Search Intention |
|---|---|---|---|
| Rice omelet | Rice omelet, Hamburger ··· | Want to eat ○○, Search for ○○ | title |
| Potato dish | Potato, Pork, Fish ··· | Containing ○○, Using ○○ | with-ingredient |
| Don't use egg | Potato, Pork, Fish ··· | Not using ○○, ○○-free | without-ingredient |
| I have an egg allergy | Allergy, Allergen ··· | | allergy-with |
| Try green-pepper dish | Try | | try |
| Chinese dish | Chinese dish, Japanese dish, Western dish, French dish ··· | Want to eat ○○, Search for ○○ | genre |

F I G. 2

| title | ingredient | genre | comment | favor | notfavor |
|---|---|---|---|---|---|
| Hypoallergenic croquette | Potato, Onion, Bread crumb, Flour | Western dish | Egg-free croquette | | |
| Ginger pork | Pork loin, Ginger, ··· | | | | |
| Omelet | Egg, Onion | Western dish | | | |
| Oden | Hanpen, Chikuwa, Konnyaku, | Japanese dish | | | |
| Croquette | Egg, Potato, Bread crumb, Onion, Flour | Western dish | | | |
| Pilaf | Green pepper, Bacon, Carrot, Rice | Western dish | Acceptable to someone that dislikes green peppers, because vegetables are finely chopped! | | Green pepper |

F I G. 3

| Input example | Search intention | Search expression | Remarks |
|---|---|---|---|
| Rice omelet | title | title LIKE %QUERY-WORD% | |
| Potato dish | with-ingredient | ingredient LIKE %QUERY-WORD% | |
| Don't use egg | without-ingredient | ingredient NOT LIKE %QUERY-WORD% | Dislike and don't want to eat (exclude egg) |
| I have an egg allergy | allergy-with | ingredient NOT LIKE %QUERY-WORD% AND ingredient NOT LIKE %product(QUERY-WORD,AND)% | Allergy (exclude egg and egg product) |
| Try green-pepper dish | try | ingredient LIKE %QUERY-WORD% AND notfavor LIKE %QUERY-WORD% | Disliked but acceptable dish (including green pepper AND intended for someone that dislikes green peppers |
| Chinese dish | genre | genre = QUERY-WORD | |

F I G. 4

| Function | Query word | Additional query word |
|---|---|---|
| product | Egg | Mayonnaise, Bacon, Sausage, Hanpen |
| product | Milk | Yogurt, Cheese, Butter |
| similar | Broccoli | Asparagus |

FIG. 5

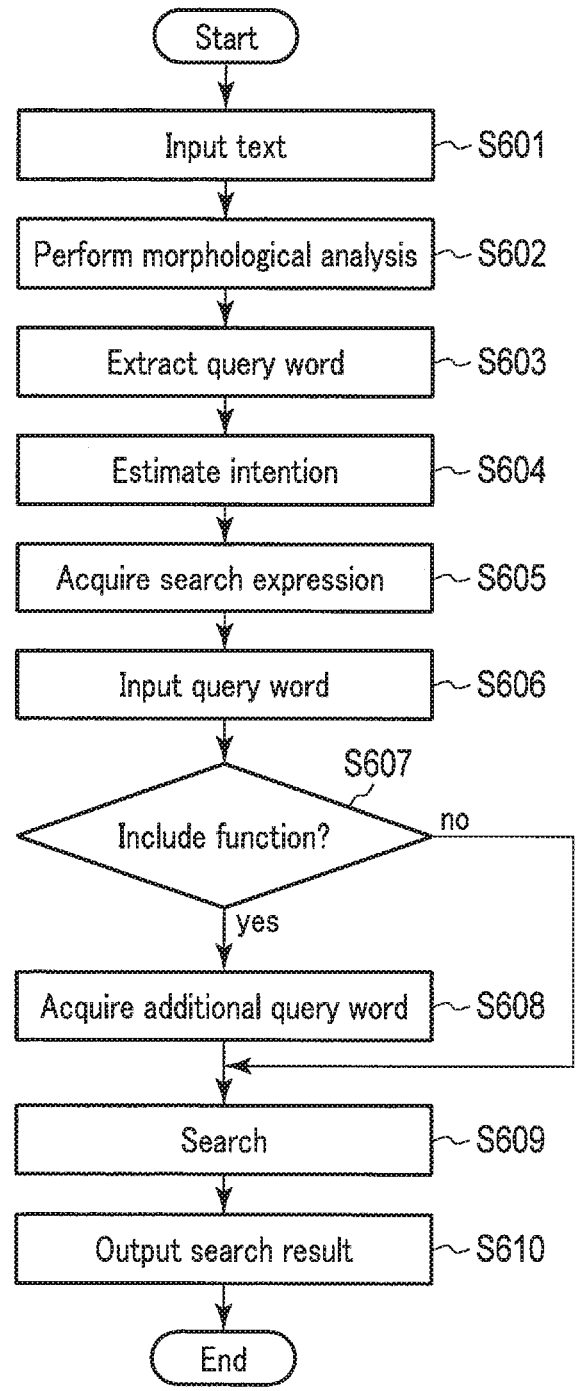
F I G. 6

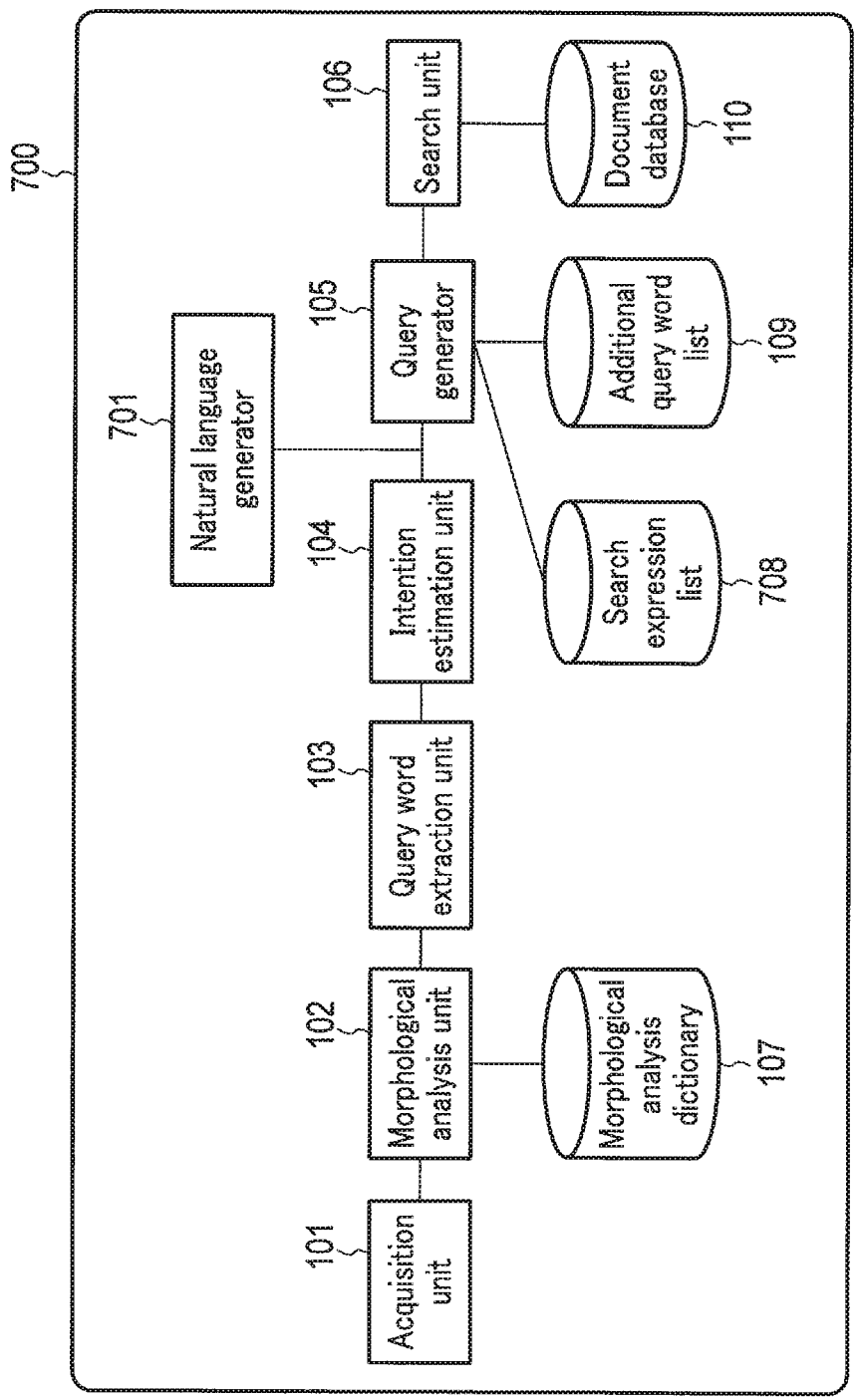
F I G. 7

FIG. 8

| Input example | Search intention | Search expression | Search intention candidate | Remarks | Response sentence data |
|---|---|---|---|---|---|
| Rice omelet | title | title LIKE %QUERY-WORD% | | | Search for a dish titled "QUERY-WORD" |
| Potato dish | with-ingredient | ingredient LIKE %QUERY-WORD% | | | Search for a dish using "QUERY-WORD" |
| Dish that does not use egg | without-ingredient | ingredient NOT LIKE %QUERY-WORD% | dont-eat | | |
| | | ingredient NOT LIKE %QUERY-WORD% AND ingredient NOT LIKE %product(QUERY-WORD)% | allergy-with | | |
| Don't use egg because I don't like it | dont-eat | ingredient NOT LIKE %QUERY-WORD% | | Don't like and don't want to eat (exclude egg) | Search for a dish that does not use "QUERY-WORD" because I don't like it |
| I have an egg allergy | allergy-with | ingredient NOT LIKE %QUERY-WORD% AND ingredient NOT LIKE %product(QUERY-WORD)% | | Allergy (exclude egg and egg product) | Search for a dish that does not use "QUERY-WORD" which is an allergen |
| I don't like green pepper | dont-like | ingredient NOT LIKE %QUERY-WORD% | dont-eat | | |
| | | ingredient LIKE %QUERY-WORD% AND notfavor LIKE %QUERY-WORD% | try | | |
| Try green-pepper dish | try | ingredient LIKE %QUERY-WORD% AND notfavor LIKE %QUERY-WORD% | | Disliked but acceptable dish (including green pepper AND intended for someone that dislikes green pepper | Search for a dish that makes "QUERY-WORD" easy to eat |
| Chinese dish | genre | genre == QUERY-WORD | | | Search for a dish of a genre of "QUERY-WORD" |

DOCUMENT SEARCH APPARATUS AND METHOD

CROSS-REFERENCE TO RELATED APPLICATIONS

This application is a Continuation Application of PCT Application No. PCT/JP2015/058541, filed Mar. 20, 2015, the entire contents of which are incorporated herein by reference.

FIELD

Embodiments described herein relate generally to a document search apparatus and method.

BACKGROUND

To search for a document through input of a natural language sentence, a method of obtaining a word in the input sentence as a query word and outputting a document including the query word is adopted. However, in this method, since all of the documents are searched with the query word, the search result may include an undesired document in which a word corresponding to the query word is used in a way that is different from an intention of the user. Document search techniques are required to enable a search for a document intended by the user.

BRIEF DESCRIPTION OF THE DRAWINGS

FIG. 1 is a block diagram showing a document search apparatus according to a first embodiment.

FIG. 2 is a diagram showing an example of a search intention list held by an intention estimation unit shown in FIG. 1.

FIG. 3 is a diagram showing an example of a document database shown in FIG. 1.

FIG. 4 is a diagram showing an example of a search expression list shown in FIG. 1.

FIG. 5 is a diagram showing an example of an additional query word list shown in FIG. 1.

FIG. 6 is a diagram showing an example of procedural steps of a document search process according to the first embodiment.

FIG. 7 is a block diagram showing a document search apparatus according to a second embodiment.

FIG. 8 is a diagram showing an example of a search expression list shown in FIG. 7.

DETAILED DESCRIPTION

Figure 9:
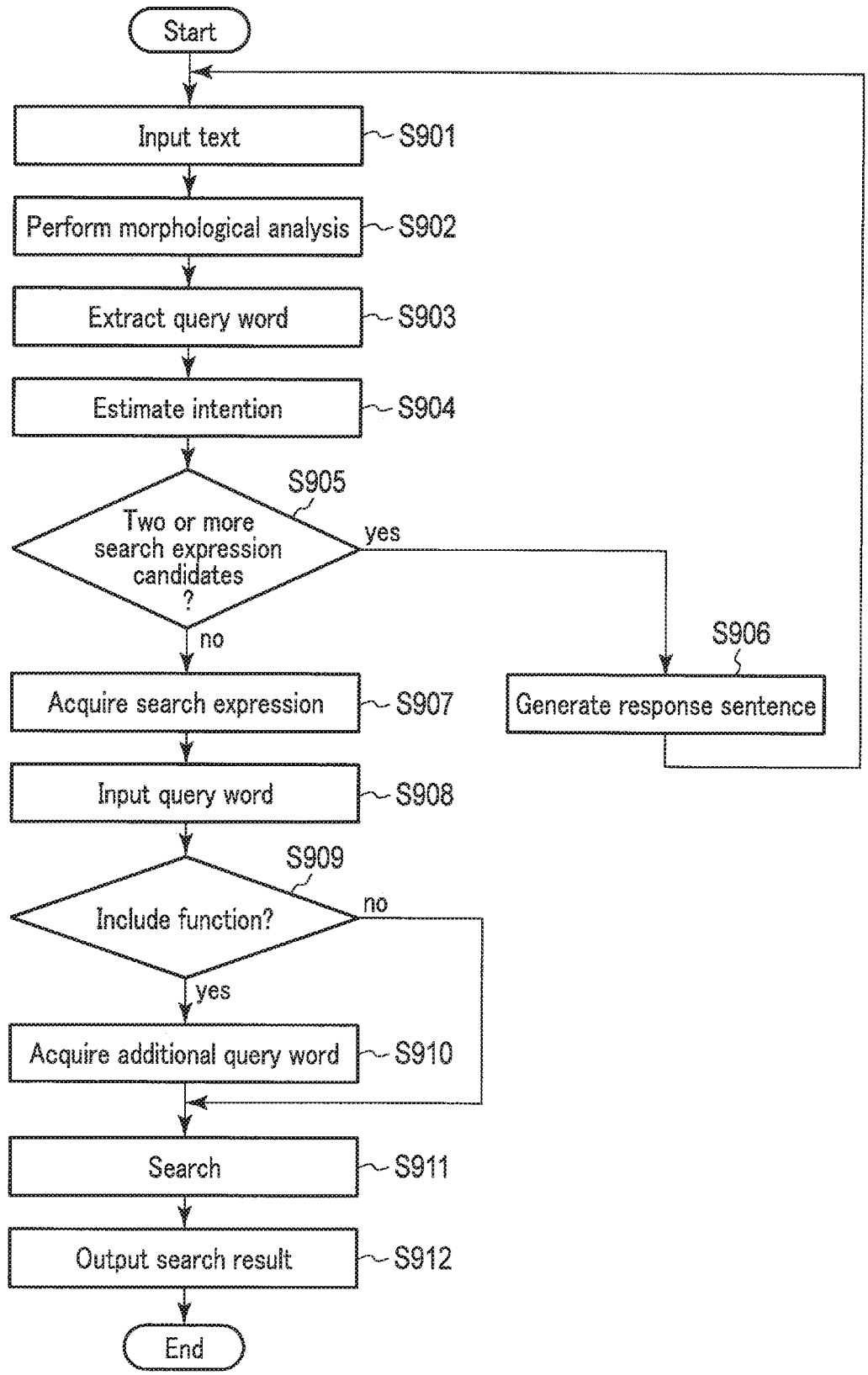
FIG. 9 is a diagram showing an example of procedural steps of a document search process according to the second embodiment.

According to one embodiment, a document search apparatus includes an acquisition unit, a morphological analysis unit, a query word extraction unit, an intention estimation unit, a search expression list, an additional query word list, a query generator, and a search unit. The acquisition unit acquires from a user an input sentence. The morphological analysis unit performs a morphological analysis of the input sentence to extract words. The query word extraction unit extracts, from the extracted words, a word for use in a search as a query word. The intention estimation unit estimates a search intention of the user based on the input sentence. In the search expression list, a plurality of search expressions are recorded. In the additional query word list, a plurality of additional query words are recorded. The query generator acquires, from the search expression list, a search expression corresponding to the estimated search intention, acquires, from the additional query word list, an additional query word corresponding to a set of the acquired search expression and the extracted query word, and generates a first query by applying the extracted query word and the acquired additional query word to the acquired search expression. The search unit searches for a document that matches the first query.

Hereinafter, embodiments will be described with reference to the drawings. The embodiments relate to a document search apparatus that searches for a document concerning a recipe. A search target is not limited to a document concerning a recipe. Regarding the embodiments described below, like elements are denoted by like reference numerals, and redundant explanations will be omitted.

First Embodiment

FIG. 1 schematically shows a document search apparatus 100 according to the first embodiment. As shown in FIG. 1, the document search apparatus 100 includes an acquisition unit 101, a morphological analysis unit 102, a query word extraction unit 103, an intention estimation unit 104, a query generator 105, a search unit 106, a morphological analysis dictionary 107, a search expression list 108, an additional query word list 109, and a document database (DB) 110.

The acquisition unit 101 acquires an input sentence from a user. For example, speech recognition, handwritten character recognition, keyboard input, etc. may be utilized as a method for acquiring an input sentence. In the case of utilizing speech recognition, the acquisition unit 101 recognizes speech uttered by the user, thereby generating a character string (text). The character string thus generated is handled as the input sentence. The acquisition unit 101 may include an input device, such as a microphone, a touch screen, or a keyboard, or may receive an input sentence from an external device.

The morphological analysis unit 102 performs a morphological analysis of the input sentence using the morphological analysis dictionary 107, thereby extracting one or more words. Each of the words may be provided with information such as a word class, a basic form, or how it is read.

The query word extraction unit 103 extracts a word for use in a search as a query word from words extracted by the morphological analysis unit 102. The query word may be extracted by a rule-based determination method; for example, a method of extracting a word class that is a noun as a query word. Words that are not suitable for use in a search may be manually listed in a stop word list, so that a word in the stop word list may not be extracted. For example, if the document search apparatus 100 is applied to a recipe search, some stop words would be "dish", "recipe", "taste", etc., which are not useful to specify a recipe.

The intention estimation unit 104 estimates (recognizes) the user's search intention based on the input sentence. The user's search intention is a tag that represents what kind of search the user intends by the input sentence. There are some methods for estimating an intention.

In one example, the intention estimation unit 104 holds a search intention list that records a plurality of search intentions, and acquires a search intention corresponding to the input sentence from the search intention list. FIG. 2 shows an example of the search intention list. In the search intention list shown in FIG. 2, a search intention is recorded in association with a keyword and/or a key phrase. To estimate a search intention of an input sentence "I have an egg allergy", a keyword "allergy" is associated with a search intention "allergy-with". The intention estimation unit 104 outputs the search intention "allergy-with", if the input sentence includes the word "allergy". To estimate a search intention of an input sentence "Don't use egg", a phrase "not use oo" is associated with a search intention "without-ingredient". The intention estimation unit 104 outputs the search intention "without-ingredient", if the input sentence includes the phrase "not use oo".

In another example, estimation is performed by a method using a machine learning model, which is constructed based on morphological analysis results of a large number of input sentences that respectively correspond to search intentions. The intention estimation method is not limited to the above examples, but may be any method.

The query generator 105 generates a query based on the search intention estimated by the intention estimation unit 104, using a search expression list 108 in which a plurality of search expressions indicating search conditions are recorded, and an additional query word list 109 in which a plurality of additional query words to be additionally used for the search are recorded. A method for generating a query will be described later.

The search unit 106 searches from the document DB 110 for a document that matches the query generated by the query generator 105. The document DB 110 stores documents as search targets. The documents are each associated with a plurality of attributes. FIG. 3 shows an example of the document DB 110 storing documents concerning recipes. In the document DB 110, the documents are each associated with attributes, such as "title" (of a dish), "ingredient" (of the dish), "genre", "comment", "favor" (for a person who likes oo), and "notfavor" (for a person who dislikes oo". Values of the attributes may be manually set by a creator when the document is created. For example, pilaf may be eaten by a person who dislikes green pepper, because it contains finely chopped vegetables. Therefore, green pepper is stored in the area of the attribute "notfavor". The attribute "notfavor" represents a dish for a person who dislikes specific ingredient. However, the value of the attribute "notfavor" is applied to not only dishes free of the subject ingredient but also dishes that contain the subject ingredient conceived to be easy to eat.

A method for generating a query will be described in detail.

FIG. 4 shows an example of the search expression list 108. In the search expression list 108 shown in FIG. 4, each of the search expressions is associated with a search intention. The search expression is described as a set of an attribute of a search target and a search method for the attribute. The search expression may be one set or a plurality of sets connected by AND or OR.

The search intention "title" is an intention for searching by the title of a dish. The search expression corresponding to the search intention "title" is "title LIKE % QUERY-WORD %", which searches for a document that includes the query word (the query word extracted by the query word extraction unit 103) in the attribute "title". The search intention "with-ingredient" is a search intention designating an ingredient. The search expression corresponding to the search intention "with-ingredient" is "ingredient LIKE % QUERY-WORD %", which searches for a document that includes the query word in the attribute "ingredient". The search intention "without-ingredient" is an intention for searching for a dish that does not contain a disliked ingredient. The search expression corresponding to the search intention "without-ingredient" is "ingredient NOT LIKE % QUERY-WORD %", which searches for a document that does not include the query word in the attribute "ingredient".

The search intention "allergy-with" is for the intention of searching for a dish adapted to deal with food allergies. The search expression corresponding to the search intention "allergy-with" is "ingredient NOT LIKE % QUERY-WORD % AND ingredient NOT LIKE % product(QUERY-WORD, AND) %", which searches for a document that does not include the query word and "product(QUERY-WORD, AND)" in the attribute "ingredient". The "product(QUERY-WORD, AND)" is a function to acquire an additional query word from the additional query word list 109. The format of the function is, for example, "FUNCTION (arg, symbol)". A function name is substituted for "FUNCTION", and an argument is substituted for "arg". The query generator 105 makes a query to the additional query word list 109 with the set of "FUNCTION" and "arg". The "symbol" designates an operator, which is used when the additional query word list 109 replies with a plurality of additional query words, to connect the additional query words. The query generator 105 makes a query to the additional query word list 109 with the set of the function name and the query word, and acquires an additional query word. The query generator 105 rewrites the "product(QUERY-WORD, AND)" with the acquired additional query word. Generally, a person with an allergy cannot eat food containing a processed product of an allergy-provoking ingredient, as well as food containing the allergy-provoking ingredient itself. Therefore, if the search intention is estimated as "allergy-with", a search for a document that does not include the query word and a processed product of the query word in the attribute "ingredient" is conducted.

If the search intention is "without-ingredient", a search for a document that does not include the subject ingredient in the attribute "ingredient" is conducted. If the search intention is "allergy-with", a search for a document that does not include the subject ingredient and a processed product of the ingredient in the attribute "ingredient" is conducted. A person who dislikes a specific ingredient does not necessarily dislike a processed product of the ingredient. For example, a person who dislikes tomatoes may eat ketchup or tomato sauce. Therefore, if the search intention is estimated to be "without-ingredient", it is considered unnecessary to exclude a processed product of the ingredient. In contrast, a person with an allergy generally cannot eat any food containing the subject ingredient; therefore, a processed product of the ingredient should also be excluded.

The search intention "try" is an intention to search for a dish to try to eat a disliked ingredient. The search expression corresponding to the search intention "try" is "ingredient LIKE % QUERY-WORD % AND notfavor LIKE % QUERY-WORD %", which searches for a document that includes the query word in the attribute "ingredient" and including the query word in the attribute "notfavor". The search intention "genre" is an intention to search for a document within a genre, such as Western dishes or Japanese dishes. The search expression corresponding to the search intention "genre" is "genre=% QUERY-WORD %", which searches for a document having a value of the attribute "genre" equal to that of the query word.

FIG. 5 shows an example of the additional query word list 109. In the additional query word list 109 shown in FIG. 5, an additional query word is associated with a function and a query word. As described above, the search expression corresponding to the search intention "allergy-with" includes the function of the "product(QUERY-WORD, AND)". A function "product" is a function that specifies a product of the ingredient corresponding to "QUERY-WORD". For example, if the extracted query word is "egg", the function "product" replies "mayonnaise", "bacon", "sausage", and "Hanpen". A function "similar" is a function that specifies food similar to the subject ingredient in texture or taste. For example, if the extracted query word is "broccoli", the function "similar" replies "asparagus", which is similar to broccoli in appearance or texture.

Query generation is performed, for example, as follows: First, the query generator 105 acquires a search expression corresponding to the estimated search intention from the search expression list 108. Then, the query generator 105 determines whether or not the search expression includes a function. If the search expression does not include a function, the query generator 105 generates a query by applying a query word to the search expression. If the search expression includes a function, the query generator 105 acquires an additional query word corresponding to the set of the function and the query word from the additional query word list. The query generator 105 generates a query by applying a set of the query word and the additional query word to the search expression.

An operation of the document search apparatus 100 is explained below.

FIG. 6 shows an example of procedural steps of a document search process of the document search apparatus 100. In the following, the procedural steps in the case where the sentence "I have an egg allergy" is input will be explained as an example. It is assumed that the search intention list shown in FIG. 2, the document DB 110 shown in FIG. 3, the search expression list 108 shown in FIG. 4, and the additional query word list 109 shown in FIG. 5 are used.

In step S601, the acquisition unit 101 acquires an input sentence which the user inputs for searching. For example, the user inputs the text "I have an egg allergy" through the keyboard. In step S602, the morphological analysis unit 102 performs a morphological analysis for the input sentence. The input sentence is divided into words (morphemes), and word class information or the like is assigned to each of the word. The input sentence "I have an egg allergy" is divided into "I", "have", "an", "egg", and "allergy".

In step S603, the query word extraction unit 103 extracts a word for use in searching as a query word from the words acquired in step S601. For example, extraction is performed in accordance with a rule of extracting a noun, and "egg" is extracted as a query word. Although the word "allergy" is a noun, it is not extracted because it is a stop word. In step S604, the intention estimation unit 104 estimates a search intention of the user based on the input sentence. Since the input sentence "I have an egg allergy" includes the word "allergy", the search intention "allergy-with" is output. The process of step S604 may be performed either in parallel with the process of step S603 or before or after the process of step S603.

In step S605, the query generator 105 acquires a search expression with reference to the search expression list 108 using the search intention estimated in step S604. When the search expression list 108 is referred to with the search intention "allergy-with", the following search expression is obtained.

ingredient NOT LIKE % QUERY-WORD %
AND
ingredient NOT LIKE % product(QUERY-WORD, AND) %

In step S606, "QUERY-WORD" in the above search expression is replaced by the query word extracted in step S603. Since "egg" is extracted as the query word in step S603, the following search expression is obtained.

ingredient NOT LIKE % egg %
AND
ingredient NOT LIKE % product(egg, AND) %

In step S607, it is determined whether or not the search expression includes a function. If the search expression includes a function, the process proceeds to step S608. If not, the process proceeds to step S609.

In step S608, the query generator 105 acquires an additional query word with reference to the additional query word list 109 using a set of a function and a query word. The search expression of this example includes the function "product". With reference to the additional query word list 109 using the set of the function "product" and the query word "egg", additional query words "mayonnaise", "bacon", "sausage", and "Hanpen" are acquired. The part of the function in the search expression is replaced by the acquired additional query words. The search expression is as follows:

ingredient NOT LIKE % egg %
AND
ingredient NOT LIKE % mayonnaise, bacon, sausage, and Hanpen %.

The above search expression is rewritten as an SQL syntax as follows:

ingredient NOT LIKE % egg %
AND
ingredient NOT LIKE % mayonnaise %
AND
ingredient NOT LIKE % bacon %
AND
ingredient NOT LIKE % sausage %
AND
ingredient NOT LIKE % Hanpen %.

If a plurality of additional query words are acquired, the expression is developed as mentioned above. To connect expressions, the operator "AND" designated in the function is used. The above search expression is given to the search unit 106 as a query.

In step S609, the search unit 106 searches for a document that matches the query from the document DB 110. In this example, the search unit 106 acquires search results including the documents with the titles "Hypoallergenic croquette" and "Ginger pork". "Omelet" and "Croquette" including "egg" in the attribute "ingredient", "Pilaf" including "bacon" in the attribute "ingredient", and "Oden" including "Hanpen" in the attribute "ingredient" are excluded from the search results. In step S610, the search results are presented to the user by a screen display or synthetic speech.

Next, the procedural steps in the case where the sentence, "Don't use egg because I don't like it" is input will be explained. First, the acquisition unit 101 acquires the sentence, "Don't use egg because I don't like it" input by the user. The input sentence "Don't use egg because I don't like it" is divided into words (morphemes) by the morphological analysis unit 102, and word class information or the like is assigned to each of the words. Then, the query word extraction unit 103 extracts a query word. Rule-based extraction is performed, and "egg" is extracted as a query word. Then, the intention estimation unit 104 estimates a search intention based on the input sentence. In this example, the search intention "without-ingredient" is output.

The query generator 105 acquires the following search expression with reference to the search expression list 108 using the search intention "without-ingredient":

ingredient NOT LIKE % QUERY-WORD %.

QUERY-WORD is replaced by the acquired query word and the following search expression is obtained:

ingredient NOT LIKE % egg %.

Then, whether the search expression includes a function or not is determined. In this example, since the search expression does not include a function, it is given to the search unit 106 as a query.

The search unit 106 makes an inquiry to the document DB 110 using the above search expression. "Omelet" and "Croquette" including "egg" in the attribute "ingredient" are excluded from the search results, and "Hypoallergenic croquette", "Ginger pork", "Oden" and "Pilaf" are output as search results.

Thus, in reply to the two sentences "I have an egg allergy" and "Don't use egg because I don't like it" both including the word "egg", search results that match the user's intention can be presented.

If the results obtained from a first search include a number of documents, the user may input another sentence to narrow down the results. After the sentence is input and the search is performed, if another sentence is input, the document search apparatus 100 can regard the second input sentence as a request for a narrowed-down search of the first search results. In this case, the query generator 105 generates a query connecting a search expression based on the first input sentence and a search expression based on the second input sentence.

As described above, the document search apparatus of the first embodiment estimates the user's search intention based on the input sentence, creates a query corresponding to the search intention, and searches for a document that matches the query. As a result, the apparatus can search for a document intended by the user.

Second Embodiment

FIG. 7 schematically shows a document search apparatus 700 according to the second embodiment. As shown in FIG. 7, the document search apparatus 700 comprises an acquisition unit 101, a morphological analysis unit 102, a query word extraction unit 103, an intention estimation unit 104, a query generator 105, a search unit 106, a morphological analysis dictionary 107, a search expression list 708, an additional query word list 109, a document DB 110, and a natural language generator 701. Explanations of parts and operations of the second embodiment that are the same as those of the first embodiment will be omitted if appropriate.

In the search expression list 708, a plurality of search expressions indicating search conditions are recorded. FIG. 8 shows an example of the search expression list 708. The search expression list 708 shown in FIG. 8 includes items of a search intention candidate and response sentence data in addition to the items of the search expression list 108 shown in FIG. 4. A search intention candidate is a candidate of a search intention that can be estimated from the search intention estimated from an input sentence. In this embodiment, there are two types of search intentions: for one type, a search expression is unambiguously determined; and for the other type, a plurality of search expressions may be considered.

Regarding the type of search intentions for which a plurality of search expressions may be considered, search intentions respectively corresponding to search expressions are recorded as search intention candidates. For example, the search intention based on the input sentence "potato dish" is "with-ingredient", and the search expression "ingredient LIKE % potato %" is unambiguously determined. On the other hand, the search intention based on the input sentence "dish that does not use egg" is "without-ingredient"; however, it is impossible to determine whether to search for "dish not using egg itself" as in the case of the input sentence "Don't use egg because I don't like it", or to search for "dish using neither egg nor egg products" as in the case of the input sentence "I have an egg allergy". Thus, if the search intention is estimated to be "without-ingredient", two search expressions may be considered. The search intention "without-ingredient" is associated with not only the two search expressions, but also search intentions "dont-eat" and "allergy-with" that unambiguously correspond to the two search expressions, respectively. Similarly, the search intention "dont-like" based on the input sentence "I don't like green pepper" is associated with the search intentions "dont-eat" and "try". The item "response data" stores data for use in generating a response sentence. With regard to the search intention having a value set for a search intention candidate, the response data need not be described. The part "QUERY-WORD" in the response data is replaced by an actual query word acquired from the input sentence.

When there are a plurality of candidates of search expressions corresponding to the search intention estimated by the intention estimation unit 104, the natural language generator 701 generates a response sentence to be output to the user in order to narrow down the candidates. The natural language generator 701 generates a response sentence to be returned to the user, using the search expression list 708 and the query word extracted by the query word extraction unit 103. The response sentence may be output as a spoken guidance by speech synthesis, or displayed on a screen.

FIG. 9 shows an example of the procedural steps of a search process of the document search apparatus 700. In the following, the procedural steps in the case where the user inputs the sentence "dish that does not use egg" will be explained. It is assumed that the search intention list shown in FIG. 2, the document DB 110 shown in FIG. 3, the search expression list 708 shown in FIG. 8, and the additional query word list 109 shown in FIG. 5 are used.

Since the processing in steps S901-S903 in FIG. 9 are the same as the processing in steps S601-S603 in FIG. 6, detailed explanations thereof will be omitted. The input sentence "dish that does not use egg" is divided into words "dish", "that", "does", "not", "use", and "egg". The word "egg" is extracted as a query word from the above words. The word "dish" is not selected, since it is recorded in a stop word list.

In step S904, the intention estimation unit 104 estimates a search intention of the user based on the input sentence. In this example, the search intention "without-ingredient" is output. In step S905, it is determined whether there are two or more candidates of a search expression. If a plurality of search intention candidates are associated with the search intention estimated by the intention estimation unit 104, there are two or more candidates of a search expression. In this case, the process proceeds to step S906. Referring to the search expression list 708, the search intention "without-ingredient" is associated with the search intention candidates "dont-eat" and "allergy-with". This means that there are two candidates of the search expression.

In step S906, the natural language generator 701 generates a response sentence using response sentence data respectively corresponding to the search intention candidates. In this example, the natural language generator 701 first acquires response sentence data of the search intention candidates described below.

[Search for a dish that doesn't use "QUERY-WORD" because I don't like it]

[Search for a dish that doesn't use "QUERY-WORD" which is an allergen]

Next, "QUERY-WORD" in the above sentence is replaced by the query word acquired in step S903.

[Search for a dish that doesn't use egg because I don't like it]

[Search for a dish that doesn't use egg as an allergen]

Finally, the natural language generator 701 generates a response sentence by connecting those sentences as follows:

"Do you want to search for a dish that doesn't use egg because you don't like it or to search for a dish that doesn't use egg, which is an allergen?"

The response sentence is notified to the user by synthetic speech or a display on a screen. The user inputs a sentence indicating either of the candidates. For example, the user inputs a sentence "a dish that doesn't use egg because I don't like it" or "I have an egg allergy". The input sentence is analyzed in the same manner, and the search intention of the user is determined to be either the search intention "dont-eat" or the search intention "allergy-with". Thus, if the first input sentence is vague, the apparatus prompts the user to re-input a definite sentence, so that one search expression can be unambiguously determined.

In reply to the response sentence, if the user inputs the sentence "I don't like egg", the search intention is estimated to be "dont-like" and the search intention candidates "dont-eat" and "try" are output. Thus, the search expressions cannot be limited to one. In this case, since the search intention candidates output in reply to the first input sentence is "dont-eat" and "allergy-with", the search intentions are narrowed down to one that is included in both the candidates that are output in reply to the first input sentence and the second input sentence. Thus, the search intention "dont-eat" is output. In this manner, even if vague sentences are repeatedly input, one unambiguous search expression can be determined.

If the search expression is determined in step S905, the process proceeds to step S907. Since the processing in steps S907 to S912 is the same as the processing in steps S605 to S610 shown in FIG. 6, a detailed explanation thereof will be omitted.

In the following, the procedural steps in the case where the sentence "I don't like green pepper" is input will be explained. In this case, the search intention "dont-like" is output in step S904. Referring to the search expression list 708, the search intention "dont-like" is associated with search intention candidates "dont-eat" and "try". Since there are a plurality of search intention candidates, the natural language generator 701 generates a response sentence. The natural language generator 701 first acquires response sentence data of the response intention candidates described below.

[Search for a dish that doesn't use "QUERY-WORD" because I don't like it]

[Search for a dish that makes "QUERY-WORD" easy to eat]

Next, the natural language generator 701 replaces "QUERY-WORD" in the above sentence by the query word acquired in step S903.

[Search for a dish that doesn't use green pepper because I don't like it]

[Search for a dish that makes green pepper easy to eat]

Finally, the natural language generator 701 generates a response sentence by connecting these sentences as follows:

"Do you want to search for a dish that doesn't use green pepper because you don't like it or to search for a dish that makes green pepper easy to eat?"

The response sentence is notified to the user by synthetic speech or by display on a screen. The user inputs a sentence indicating either of the candidates. For example, the user inputs a sentence "a dish that doesn't use green pepper because I don't like it" or "a dish that makes green pepper easy to eat". The document search apparatus 700 analyzes the input sentence in the same manner, and the search intention is determined to be either the search intention "dont-eat" or the search intention "try". Thus, if an input sentence is vague, a definite sentence can be re-input; therefore, one unambiguous search expression can be determined.

As described above, the document search apparatus of the second embodiment prompts the user to make a choice if two or more search expressions are considered from the sentence input by the user. Accordingly, search expressions can be narrowed down to one. As a result, a document intended by the user can be searched for.

Third Embodiment

Assume that the following communication was made through the document search apparatus 700 of the second embodiment.

User: "A dish that doesn't use egg" (the query word: egg)

System: "Do you want to search for a dish that doesn't use egg because you don't like egg, or to search for a dish that doesn't use egg which is an allergen?"

User: "I don't like it"

The last input sentence does not include the word "egg" that is included in the first input sentence. In this case, the document search apparatus cannot perform a correct search by processing only the last sentence. In this embodiment, query words are stored in a memory until they are used in search expressions. When a "QUERY-WORD" included in a search expression is replaced by a query word, the query words stored in the memory are used as well as the query word extracted from the last input sentence.

Figure 10:
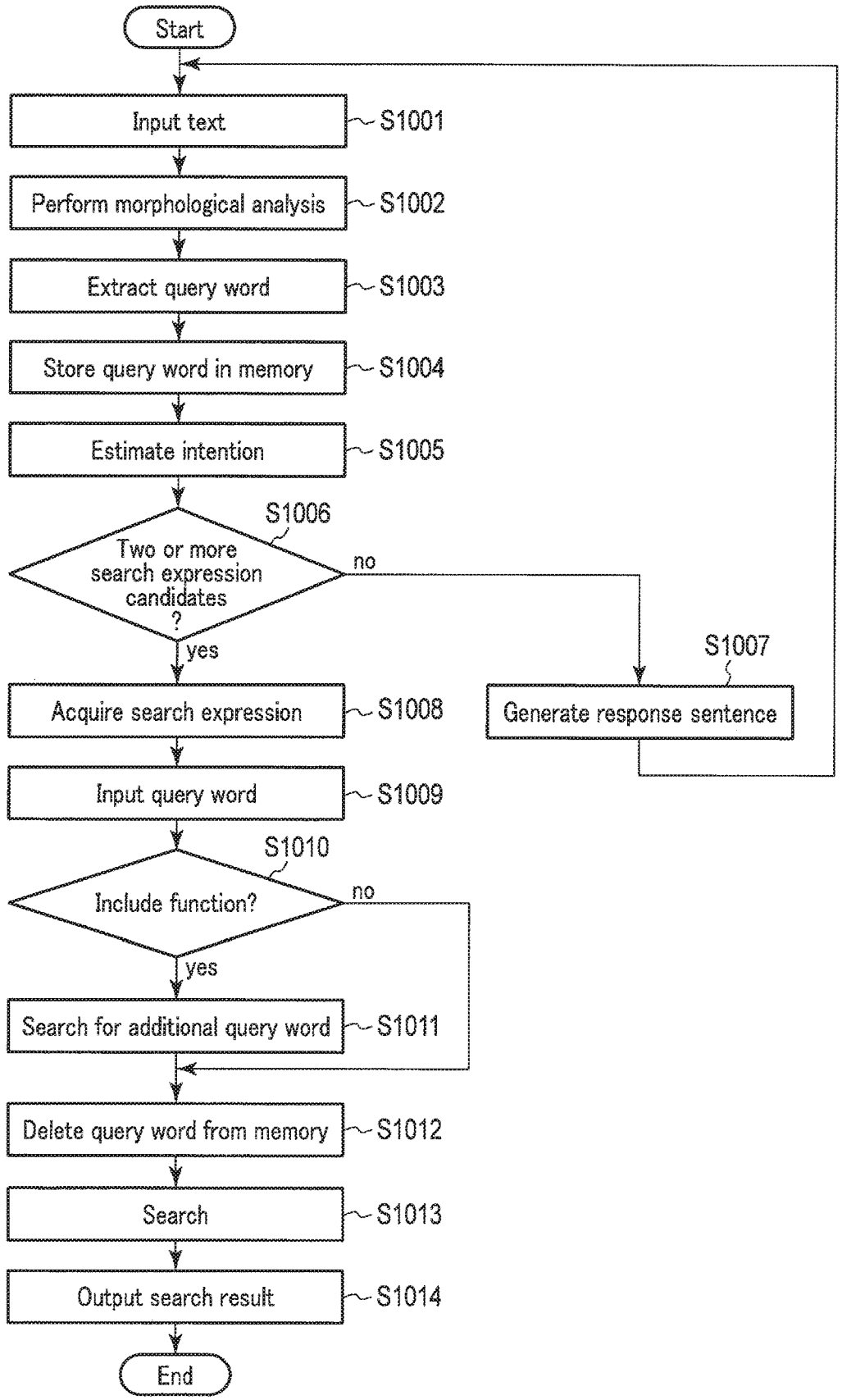
FIG. 10 is a diagram showing an example of procedural steps of a document search process according to a third embodiment.

FIG. 9 shows an example of the procedural steps of the document search process of the third embodiment. Since the processing in steps S1001-S1003, S1005-S1011, S1013, and S1014 in FIG. 10 are the same as the processing in steps S901-S912 in FIG. 9, detailed explanations thereof will be omitted if appropriate.

When an input sentence is acquired (step S1001) and a query word is extracted (step S1003), the query word is stored in the memory (step S1004). In this example, a search is not performed when the first sentence is input, and a response sentence to select a search intention candidate is presented to the user (step S1007). Then, when the user inputs a second sentence, the search intention is determined to be "dont-eat" (step S1005). If a query word is extracted from the second input sentence, the query word is also stored in the memory. Then, a query word stored in the memory is input into a search expression (step S1009). When a query is generated, all query words are deleted from the memory (step S1012). With this processing, the user need not input the same query word repeatedly.

As described above, according to the third embodiment, query words are stored in the memory until they are used in search expressions. Therefore, when the user replies to a response sentence, even if the user omits input of a previously input word, a search can be executed appropriately.

Fourth Embodiment

The natural language generator 701 shown in FIG. 7 may notify the user what search the system is going to perform, not only when the user inquires candidates of a search intention. For example, the following communication is made:

User: "I want to eat croquette"
System: "Searching for a dish titled 'Croquette'" Search with "title LIKE % croquette %"
Search results: Hypoallergenic croquette, Croquette If the results obtained from a first search include a number of documents, the user may input another sentence to narrow down the results. After the sentence is input and the search is performed, if another sentence is input, the document search apparatus 700 regards the second input sentence as a request for a narrowed-down search of the first search results. The natural language generator 701 notifies the user that the search is performed by connecting a search expression based on the first input sentence and a search expression based on the second input sentence. In this case, for example, the following communication is made:

User: "I want to eat croquette"
System: "Searching for a dish titled 'Croquette'"
Search with "title LIKE % croquette %"
Search results: Hypoallergenic croquette, Croquette
User: "I have an egg allergy"
System: "Searching among search results for a dish that doesn't use egg which is an allergen"
Search with "title LIKE % croquette % AND (ingredient NOT LIKE % egg % AND ingredient NOT LIKE % mayonnaise % AND ingredient NOT LIKE % bacon % AND ingredient NOT LIKE % sausage % AND ingredient NOT LIKE % Hanpen %)
Search results: Hypoallergenic croquette With the narrowed-down search mentioned above, according to the document DB 110 shown in FIG. 3, "Hypoallergenic croquette" is output.

The fourth embodiment enables the user to know what kind of search is going to be performed.

In any of the embodiments described above, the document DB is incorporated in the document search apparatus. Alternatively, the document DB may be provided in an external device connected to the document search apparatus via a network, such as the Internet.

The instructions indicated in the operation procedure of the above-described embodiments can be carried out based on a software program. It is possible to configure a general-purpose calculating system to store this program in advance and to read the program in order to achieve the same advantageous effects as those achieved by the document search apparatus described above. The instructions described in the above embodiments are recorded in a magnetic disc (flexible disc, hard disc, etc.), an optical disc (CD-ROM, CD-R, CD-RW, DVD-ROM, DVD±R, DVD±RW, etc.), a semiconductor memory, or similar storage medium, as a program executable by a computer. As long as a storage medium is readable by a computer or an embedded system, any storage type can be adopted. An operation similar to the operation of the document search apparatus of the above-described embodiments can be realized if a computer reads a program from the storage medium, and executes the instructions written in the program on the CPU based on the program. A program can be obtained or read by a computer through a network, of course.

Furthermore, an operating system (OS) working on a computer, database management software, middleware (MW) of a network, etc. may be executed a part of processes for realizing the present embodiments based on instructions from a program installed from a storage medium onto a computer and an embedded system.

Furthermore, the storage medium according to the present embodiments is not limited to a medium independent from a system or an embedded system; a storage medium storing or temporarily storing a program downloaded through LAN or the Internet, etc. is also included as the storage medium according to the present embodiments.

Furthermore, a storage medium is not limited to one; when the process according to the present embodiments is carried out in multiple storage media, these storage media are included as a storage medium according to the present embodiments, and can take any configuration.

The computer or embedded system in the present embodiments are used to execute each process disclosed in the present embodiments based on a program stored in a storage medium, and the computer or embedded system may be an apparatus consisting of a PC or a microcomputer, etc. or a system, etc. in which a plurality of apparatuses are connected through network.

The computer adopted in the present embodiments is not limited to a PC; it may be a calculation processing apparatus, a microcomputer, etc. included in an information processor, and a device and apparatus that can realize the functions disclosed in the present embodiments by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A document search apparatus comprising:
a processor that is configured to:
acquire from a user an input sentence;
perform a morphological analysis of the input sentence to extract words;
extract, from the extracted words, a word for use in a search as a query word;
estimate a search intention of the user based on the input sentence;
acquire, from a search expression list in which a plurality of search expressions are recorded, a search expression corresponding to the estimated search intention;
acquire, from an additional query word list in which a plurality of additional query words are recorded, an additional query word corresponding to a set of the acquired search expression and the extracted query word;
generate a first query by applying the extracted query word and the acquired additional query word to the acquired search expression;
search for a document that matches the first query; and
output a result of the search to the user by at least one of a screen display and synthetic speech.

2. The document search apparatus according to claim 1, wherein if the acquired search expression includes a function to acquire an additional query word, the processor acquires, from the additional query word list, an additional query word corresponding to a set of the function and the extracted query word, and replaces the function in the acquired search expression with the acquired additional query word.

3. The document search apparatus according to claim 1, wherein the processor is further configured, if there are a plurality of candidates of search expressions corresponding to the estimated search intention, to generate a response sentence to be output to the user to narrow down the candidates.

4. The document search apparatus according to claim 3, wherein the processor acquires another input sentence input by the user in reply to the response sentence, extracts another query word based on the other input sentence, and generates the first query based on the extracted query word and the extracted other query word.

5. The document search apparatus according to claim 1, wherein if the user inputs another input sentence, the processor generates a second query based on the other input sentence, generates a third query by connecting the first query and the second query, and searches for a document that matches the third query.

6. The document search apparatus according to claim 1, wherein the processor holds a search intention list in which a plurality of search intentions are recorded in association with a keyword or a key phrase, and acquires a search intention corresponding to the input sentence from the search intention list.

7. The document search apparatus according to claim 1, wherein if the acquired search expression includes a function to acquire an additional query word, the processor acquires, from the additional query word list, an additional query word corresponding to a set of the function and the extracted query word, and generates the first query by applying the extracted query word and the acquired additional query word to the acquired search expression, and if the acquired search expression does not include the function, the processor generates the first query by applying the extracted query word to the acquired search expression.

8. A document search method for a document search apparatus that includes a processor, the document search method comprising, performing by the processor, operations of:
acquiring from a user an input sentence;
performing a morphological analysis of the input sentence to extract words;
extracting, from the extracted words, a word for use in a search as a query word;
estimating a search intention of the user based on the input sentence;
acquiring, from a search expression list in which a plurality of search expressions are recorded, a search expression corresponding to the estimated search intention;
acquiring, from an additional query word list in which a plurality of additional query words are recorded, an additional query word corresponding to a set of the acquired search expression and the extracted query word;
generating a first query by applying the extracted query word and the acquired additional query word to the acquired search expression;
searching for a document that matches the first query; and
outputting a result of the search to the user by at least one of a screen display and synthetic speech.

9. The document search method according to claim 8, wherein if the acquired search expression includes a function to acquire an additional query word, the acquiring the additional query word comprises acquiring, from the additional query word list, an additional query word corresponding to a set of the function and the extracted query word, and the method further comprises replacing the function in the acquired search expression with the acquired additional query word.

10. The document search method according to claim 8, further comprising generating, if there are a plurality of candidates of search expressions corresponding to the estimated search intention, a response sentence to be output to the user to narrow down the candidates.

11. The document search method according to claim 10, further comprising:
acquiring another input sentence input by the user in reply to the response sentence; and
extracting another query word from the other input sentence; and
wherein the generating the first query comprises generating the first query based on the extracted query word and the extracted other query word.

12. The document search method according to claim 8, further comprising:
acquiring from the user another input sentence;
generating a second query based on the other input sentence; and
generating a third query by connecting the first query and the second query, and
wherein the searching comprises searching for a document that matches the third query.

13. The document search method according to claim 8, wherein the estimating the search intention of the user comprises acquiring, from a search intention list in which a plurality of search intentions are recorded in association with a keyword or a key phrase, a search intention corresponding to the input sentence.

14. The document search method according to claim 8, wherein if the acquired search expression includes a function to acquire an additional query word, the acquiring the additional query word comprises acquiring, from the additional query word list, an additional query word corresponding to a set of the function and the extracted query word, and the generating the first query comprises generating the first query by applying the extracted query word and the acquired additional query word to the acquired search expression, and if the acquired search expression does not include the function, the generating the first query word comprises generating the first query by applying the extracted query word to the acquired search expression.

15. A non-transitory computer readable medium including computer executable instructions, wherein the instructions, when executed by a processor, cause the processor to perform a method comprising:
acquiring from a user an input sentence;
performing a morphological analysis of the input sentence to extract words;
extracting, from the extracted words, a word for use in a search as a query word;
estimating a search intention of the user based on the input sentence;

acquiring, from a search expression list in which a plurality of search expressions are recorded, a search expression corresponding to the estimated search intention;
acquiring, from an additional query word list in which a plurality of additional query words are recorded, an additional query word corresponding to a set of the acquired search expression and the extracted query word;
generating a first query by applying the extracted query word and the acquired additional query word to the acquired search expression;
searching for a document that matches the first query; and
outputting a result of the search to the user by at least one of a screen display and synthetic speech.

* * * * *